(12) United States Patent
Miller et al.

(10) Patent No.: US 11,243,547 B2
(45) Date of Patent: Feb. 8, 2022

(54) SYSTEMS AND METHODS FOR REMOTE INSPECTION OF A VEHICLE

(71) Applicant: UATC, LLC, San Francisco, CA (US)

(72) Inventors: Robert Evan Miller, San Mateo, CA (US); Alden James Woodrow, Oakland, CA (US); Eyal Cohen, San Francisco, SC (US)

(73) Assignee: UATC, LLC, Mountain View, CA (US)

( * ) Notice: Subject to any disclaimer, the term of this patent is extended or adjusted under 35 U.S.C. 154(b) by 792 days.

(21) Appl. No.: 15/933,499

(22) Filed: Mar. 23, 2018

(65) Prior Publication Data
US 2019/0227570 A1   Jul. 25, 2019

Related U.S. Application Data

(60) Provisional application No. 62/620,656, filed on Jan. 23, 2018.

(51) Int. Cl.
*G05D 1/02* (2020.01)
*G07C 5/00* (2006.01)

(52) U.S. Cl.
CPC ......... *G05D 1/0291* (2013.01); *G05D 1/0225* (2013.01); *G05D 1/0297* (2013.01); *G07C 5/008* (2013.01)

(58) Field of Classification Search
CPC ............ G05D 1/00; G05D 1/02; G05D 1/021; G05D 1/0212; G05D 1/0225; G05D 1/0287; G05D 1/0291; G05D 1/0297; G07C 5/00; G07C 5/008; G07C 5/08; G07C 5/0816
See application file for complete search history.

(56) References Cited

U.S. PATENT DOCUMENTS

| | | | |
|---|---|---|---|
| 2005/0251304 A1* | 11/2005 | Cancellara | G07C 5/0808 701/31.4 |
| 2017/0278312 A1* | 9/2017 | Minster | G06Q 10/00 |
| 2018/0154906 A1* | 6/2018 | Dudar | B60R 21/0136 |
| 2019/0055015 A1* | 2/2019 | Allard | B60R 16/0234 |

FOREIGN PATENT DOCUMENTS

| | | |
|---|---|---|
| DE | 102016006672 | 12/2016 |
| WO | WO2017048165 | 3/2017 |
| WO | WO2017148531 | 9/2017 |

OTHER PUBLICATIONS

International Search Report and Written Opinion for Application No. PCT/US2019/012857, dated Apr. 2, 2019, 12 pages.

* cited by examiner

*Primary Examiner* — Charles J Han
(74) *Attorney, Agent, or Firm* — Dority & Manning, P.A.

(57) ABSTRACT

Systems and methods for controlling an autonomous vehicle are provided. In one example embodiment, a computer-implemented method includes determining vehicle diagnostics information associated with a first autonomous vehicle that is part of a fleet of vehicles controlled by a first entity to provide a vehicle service to a second entity. The method includes determining remote inspection information that includes an assessment of one or more categories pertaining to a third entity, based at least in part on the vehicle diagnostics information. The method includes providing the remote inspection information to the third entity to provide the vehicle service.

20 Claims, 8 Drawing Sheets

FIG. 8

SYSTEMS AND METHODS FOR REMOTE INSPECTION OF A VEHICLE

PRIORITY CLAIM

The present application claims the benefit of priority of U.S. Provisional Patent Application No. 62/620,656 filed Jan. 23, 2018, entitled "Systems and Methods For Remote Inspection of a Vehicle." The above-referenced patent application is incorporated herein by reference.

FIELD

The present disclosure relates generally to providing inspection information to a remote third-party entity.

BACKGROUND

An autonomous vehicle is a vehicle that is capable of sensing its environment and navigating without human input. In particular, an autonomous vehicle can observe its surrounding environment using a variety of sensors and can attempt to comprehend the environment by performing various processing techniques on data collected by the sensors. Given knowledge of its surrounding environment, the autonomous vehicle can identify an appropriate motion plan through such surrounding environment.

SUMMARY

Aspects and advantages of the present disclosure will be set forth in part in the following description, or may be learned from the description, or may be learned through practice of the embodiments.

One example aspect of the present disclosure is directed to a computer-implemented method for controlling an autonomous vehicle to provide a vehicle service. The method includes determining, by one or more computing devices, vehicle diagnostics information associated with a first autonomous vehicle that is part of a fleet of vehicles controlled by a first entity to provide a vehicle service to a second entity. The method includes determining, by the one or more computing devices, remote inspection information that includes an assessment of one or more categories pertaining to a third entity, based at least in part on the vehicle diagnostics information. The method includes providing, by the one or more computing devices, the remote inspection information to the third entity to provide the vehicle service.

Another example aspect of the present disclosure is directed to a computing system for controlling an autonomous vehicle to provide a vehicle service. The computing system includes one or more processors and one or more tangible, non-transitory, computer readable media that collectively store instructions that when executed by the one or more processors cause the computing system to perform operations. The operations include determining vehicle diagnostics information associated with a first autonomous vehicle that is part of a fleet of vehicles controlled by a first entity to provide a vehicle service to a second entity. The operations include determining remote inspection information that includes an assessment of one or more categories pertaining to a third entity, based at least in part on the vehicle diagnostics information. The operations include providing the remote inspection information to the third entity to provide the vehicle service.

Yet another example aspect of the present disclosure is directed to an autonomous vehicle. The autonomous vehicle includes one or more processors and one or more tangible, non-transitory, computer readable media that collectively store instructions that when executed by the one or more processors cause the autonomous vehicle to perform operations. The operations include determining vehicle diagnostics information associated with the autonomous vehicle, the autonomous vehicle controlled by a first entity to provide a vehicle service to a second entity. The operations include determining remote inspection information that includes an assessment of one or more categories pertaining to a third entity, based at least in part on the vehicle diagnostics information. The operations include providing the remote inspection information to the third entity to provide the vehicle service.

Other example aspects of the present disclosure are directed to systems, methods, vehicles, apparatuses, tangible, non-transitory computer-readable media, and memory devices for controlling an autonomous vehicle.

These and other features, aspects, and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth below, which make reference to the appended figures, in which.

Reference numerals that are repeated across plural figures are intended to identify the same components or features in various implementations.

DETAILED DESCRIPTION

Example aspects of the present disclosure are directed to controlling an autonomous vehicle to provide inspection information to a remote third-party entity (e.g., provide remote inspection information). An entity (e.g., service provider) can use a fleet of vehicles to provide a vehicle service (e.g., transportation service, delivery service, courier service, etc.) for an entity requesting the vehicle service (e.g., customer). The fleet can include, for example, autonomous vehicles that can drive, navigate, operate, etc. with minimal and/or no interaction from a human driver. A service provider can control an autonomous vehicle in the fleet of vehicles to provide the vehicle service for a customer in one or more jurisdictions under the purview of one or more third-party entities (e.g., law enforcement entity, transportation infrastructure regulatory entity, tax assessment entity, etc.). The service provider can control the autonomous vehicle to provide remote inspection information associated with the autonomous vehicle to the one or more third-party entities when the autonomous vehicle is operating in the one or more jurisdictions.

As an example, a service provider can provide a vehicle service across a state boundary between two states that are each governed by a different state government with different laws and regulations for operating an autonomous vehicle, and policed by different law enforcement entities. As another example, a service provider can provide a vehicle service across a national boundary between two nations that are each governed by different government entities. As yet another example, a service provider can provide a vehicle service using a highway transportation infrastructure administered by a highway transportation administration, using a maritime transportation infrastructure administered by a port authority, using an air transportation infrastructure administered by an aviation administration, and/or within a shared environment administered by one or more of a national, state and local environmental protection entity.

As another example, a service provider can control an autonomous vehicle to autonomously determine remote inspection information, and control the autonomous vehicle to provide the remote inspection information to a third-party entity. In particular, the autonomous vehicle can determine the remote inspection information based on diagnostics information associated with the autonomous vehicle. The autonomous vehicle can generate the diagnostics information and/or obtain the diagnostics information from an external monitor. The remote inspection information can include, for example, a speed of the autonomous vehicle, a weight of a cargo item attached to the autonomous vehicle, a contents of a cargo item attached to the autonomous vehicle, an engine status, tire pressure, tire wear, readings of one or more sensors on-board the autonomous vehicle, an operating status of one or more sensors on-board the autonomous vehicle, a distance travelled by the autonomous vehicle, fuel consumption, emissions levels, a physical location of the autonomous vehicle, an indication of one or more faults detected by the autonomous vehicle, etc. The autonomous vehicle can provide, for example, remote inspection information including a speed of the autonomous vehicle to a law enforcement entity, remote inspection information including a weight of a cargo item attached to the autonomous vehicle to a tax assessment entity, etc. Additionally, and/or alternatively, an operations computing system associated with the service provider can mediate communication between the autonomous vehicle and one or more third-party entities.

As yet another example, a service provider can control an autonomous vehicle to travel to a vicinity of an external monitor that can determine remote inspection information associated with the autonomous vehicle. In particular, the external monitor can determine the remote inspection information based on diagnostics information associated with the autonomous vehicle. The external monitor can generate the diagnostics information and/or obtain the diagnostics information from the autonomous vehicle. The external monitor can provide the remote inspection information to a third-party entity. The remote inspection information can include, for example, a speed of the autonomous vehicle, a weight of a cargo item attached to the autonomous vehicle, a content of a cargo item attached to the autonomous vehicle, tire wear, emissions levels, a physical location of the autonomous vehicle, physical damage to the autonomous vehicle, etc. The external monitor can provide, for example, remote inspection information including a weight of a cargo item attached to the autonomous vehicle to a tax assessment entity, and remote inspection information including emissions levels of the autonomous vehicle to an environmental protection entity.

A service provider can use one or more vehicles (e.g., ground-based vehicles) to provide a vehicle service such as a transportation service, a courier service, a delivery service, etc. The vehicles can be autonomous vehicles that include various systems and devices configured to control the operation of the vehicle. For example, an autonomous vehicle can include an onboard vehicle computing system for operating the vehicle (e.g., located on or within the autonomous vehicle). The vehicle computing system can receive sensor data from sensors onboard the vehicle (e.g., cameras, LIDAR, RADAR), attempt to comprehend the environment proximate to the vehicle by performing various processing techniques on the sensor data, and generate an appropriate motion plan through the environment. Moreover, the autonomous vehicle can be configured to communicate with one or more computing systems that are remote from the vehicle. For example, an autonomous vehicle can communicate with an operations computing system that can be associated with the service provider. The operations computing system can help the service provider monitor, communicate with, manage, etc. the fleet of vehicles. As another example, an autonomous vehicle can communicate with one or more other autonomous vehicles, a customer computing system, law enforcement computing system, regulatory entity computing system, etc. In some implementations, the operations computing system can mediate communication between the autonomous vehicle and one or more other remote computing systems.

In some implementations, the service provider can control an autonomous vehicle to autonomously determine remote inspection information. In particular, the autonomous vehicle can generate diagnostics information associated with an operation of the autonomous vehicle, and determine the remote inspection information based on the diagnostics information. The service provider can control the autonomous vehicle to autonomously generate such diagnostics information while the autonomous vehicle is in use. The diagnostics information can include information corresponding to one or more systems on-board the autonomous vehicle and/or information corresponding to an environment in which the autonomous vehicle operates. For example, diagnostics information can include information on one or more faults detected with respect to one or more systems on-board an autonomous vehicle. As another example, diagnostics information can include sensor data obtained by one or more sensors on-board an autonomous vehicle. The sensor data can include information on one or more components of the autonomous vehicle and/or information on an environment in which the autonomous vehicle operates.

In some implementations, the service provider can control an autonomous vehicle to travel to a vicinity of an external monitor to determine remote inspection information associated with the autonomous vehicle. In particular, the service provider can control the autonomous vehicle to provide a vehicle service using a transportation network that includes one or more external monitors at one or more locations. The transportation network can include a plurality of transfer hubs and a plurality of transportation routes that link the plurality of transfer hubs with one another. The transportation network can utilize, for example, one or more of a highway transportation infrastructure, maritime transportation infrastructure, and air transportation infrastructure.

In some implementations, the transportation network can include one or more external monitors that can determine remote inspection information associated with an autonomous vehicle. In particular, the one or more external monitors can determine the remote inspection information based on diagnostics information associated with the autonomous vehicle, and can provide the remote inspection information to a third-party entity. The one or more external monitors can generate the diagnostics information and/or obtain the diagnostics information from the autonomous vehicle, when the autonomous vehicle is in a vicinity of the external monitor.

In some implementations, the plurality of transfer hubs can include one or more external monitors that can determine remote inspection information associated with an autonomous vehicle when the autonomous vehicle enters and/or exits the transfer hub. The one or more external monitors can include an autonomous inspector that can inspect the autonomous vehicle and/or a human inspector that can inspect the autonomous vehicle. For example, an external monitor can include a camera that visually inspects an autonomous vehicle to generate diagnostics information associated with the autonomous vehicle and determine remote inspection information based on the diagnostics information. As another example, an external monitor can include a weigh scale that can weigh a cargo item attached to an autonomous vehicle to generate diagnostics information associated with the autonomous vehicle and determine remote inspection information based on the diagnostics information. As yet another example, an external monitor can include a human inspector that can perform an inspection of an autonomous vehicle to generate diagnostics information associated with the autonomous vehicle and determine remote inspection information based on the diagnostics information. As yet another example, an external monitor can include a wireless beacon configured to wirelessly communicate with an autonomous vehicle as it passes a location of the beacon to obtain diagnostics information from the autonomous vehicle.

In some implementations, the plurality of transportation routes can include one or more external monitors located at one or more locations along the transportation routes that can determine remote inspection information associated with an autonomous vehicle when the autonomous vehicle passes within a vicinity of the external monitor. For example, a transportation route can include a plurality of external monitors at periodic intervals along the transportation route. As another example, a transportation route can include an external monitor where the transportation route crosses a jurisdictional boundary. As yet another example, an external monitor can include a dedicated and/or physical connection to a communications network, and the transportation route can include an external monitor where wireless communication is unavailable or unreliable.

In some implementations, the service provider can control an autonomous vehicle to provide remote inspection information to a third-party entity. For example, a service provider can control an autonomous vehicle to autonomously provide remote inspection information to a third-party entity at one or more times when the autonomous vehicle is in use. As another example, a service provider can control an autonomous vehicle to travel to a vicinity of an external monitor when the autonomous vehicle enters and/or exits a transfer hub, to provide remote inspection information to a third-party entity. As yet another example, a service provider can control an autonomous vehicle to autonomously provide remote inspection information to an external monitor, when the autonomous vehicle is travelling on a transportation route.

In some implementations, an external monitor can communicate with one or more of a service provider, an autonomous vehicle, and a third-party entity. For example, an external monitor can communicate diagnostics information to a service provider. As another example, an external monitor can communicate diagnostics information to an autonomous vehicle that it inspected so that the autonomous vehicle can aggregate diagnostics information form one or more sources. The service provider can determine remote inspection information based on diagnostics information obtained from an external monitor and/or an autonomous vehicle, and provide the remote inspection information to a third-party entity. Additionally and/or alternatively, the service provider can control the autonomous vehicle to autonomously determine remote inspection information based on aggregated diagnostics information, and provide the remote inspection information to a third-party entity.

In some implementations, an external monitor can be fixed at a particular geographic location. For example, an external monitor that includes a weigh scale can be fixed at a location in a transfer hub. In some implementations, an external monitor can be mobile. For example, an external monitor that includes a camera to visually inspect an autonomous vehicle can be affixed to another vehicle. A service provider can control a first autonomous vehicle affixed with an external monitor to travel to a vicinity of a second autonomous vehicle so that the external monitor can inspect the second autonomous vehicle and determine remote inspection information associated with the second autonomous vehicle.

In some implementations, a service provider can control a first autonomous vehicle affixed with an external monitor to travel to a vicinity of a second autonomous vehicle in response to a request by the second autonomous vehicle. For example, if a first autonomous vehicle detects a fault with a tire pressure sensor, then the first autonomous vehicle can request that a second autonomous vehicle affixed with an external monitor travel to a vicinity of the first autonomous vehicle to visually inspect one or more tires of the first autonomous vehicle. The second autonomous vehicle can communicate a status of the first autonomous vehicle's tires to the first autonomous vehicle.

In some implementations, one or more sensors onboard an autonomous vehicle (e.g., cameras, LIDAR, RADAR) can be used to inspect another vehicle (e.g., a second autonomous vehicle) and determine remote inspection information associated with the vehicle. For example, if a first autonomous vehicle detects a fault with respect to a tire pressure sensor and requests an external inspection, a service provider can control one or more other autonomous vehicles in a fleet of vehicles to travel to a vicinity of the first autonomous vehicle to visually inspect one or more tires of the first autonomous vehicle. The second autonomous vehicle can communicate a status of the first autonomous vehicle's tires to the first autonomous vehicle.

In some implementations, the remote inspection information can include a status of one or more categories pertaining to a third-party entity to which the remote inspection information is provided. For example, remote inspection information can include a numerical value as a status for a speed and/or a weight associated with an autonomous vehicle. As another example, remote inspection information can include an indication of "under speed limit", "within a threshold value of the speed limit", or "over speed limit" as a status for a speed. As yet another example, remote inspection information can include an indication of "unchanged" or "changed" as a status for a weight, relative to a starting weight associated with an autonomous vehicle.

In some implementations, a status of one or more categories can include "green", "yellow", and "red", and the one or more categories can include a first category corresponding to one or more components of an autonomous vehicle, a second category corresponding to a performance of an autonomous vehicle, and a third category corresponding to a surrounding environment of an autonomous vehicle.

As an example, a category of one or more components of an autonomous vehicle can include one or more of a vehicle platform, vehicle computing system, one or more sensors, engine, tires, etc. Remote inspection information associated with the autonomous vehicle can include "green" for a status of the components if diagnostics information associated with the autonomous vehicle indicates that all the components of the autonomous vehicle are functioning properly and there are no detected faults. Remote inspection information associated with the autonomous vehicle can include "yellow" for a status of the components of the autonomous vehicle if vehicle diagnostics information associated with the autonomous vehicle indicates that a problem or detected fault (e.g., engine temperature is high, tire pressure is low), but a current operation of the autonomous vehicle can be completed safely. Remote inspection information associated with the autonomous vehicle can include "red" for a status of the components of the autonomous vehicle if vehicle diagnostics information associated with the autonomous vehicle indicates a critical problem or error that affects a safe operation of the autonomous vehicle.

As another example, a category of performance of an autonomous vehicle can include one or more of a speed, distance travelled, fuel consumption, weight, emissions, coolant level, brake wear, etc. Remote inspection information associated with the autonomous vehicle can include "green" for a status of the performance of the autonomous vehicle if a speed, weight, and emissions are within an acceptable range for a jurisdiction in which the autonomous vehicle is operating. Remote inspection information associated with the autonomous vehicle can include "yellow" for a status of the performance of the autonomous vehicle if there is a spike in fuel consumption or emissions while the autonomous vehicle is in operation. Remote inspection information associated with the autonomous vehicle can include "red" for a status of the performance of the autonomous vehicle if a coolant level drops below a critical level and a brake wear exceeds a critical level.

As yet another example, a category of a surrounding environment of an autonomous vehicle can include one or more of road conditions, weather conditions, traffic conditions, etc. Remote inspection information associated with the autonomous vehicle can include "green" for a status of the surrounding environment if the autonomous vehicle encounters good road conditions (e.g., well maintained, existence of safety lanes, etc.). Remote inspection information associated with the autonomous vehicle can include "yellow" for a status of the surrounding environment if the autonomous vehicle encounters construction zones, inclement weather affecting visibility or traction, or traffic congestion. Remote inspection information associated with the autonomous vehicle can include "red" for a status of the surrounding environment if the autonomous vehicle encounters a hazard, accident, or other event that renders a road segment impassable.

In some implementations, the service provider can control an autonomous vehicle and/or an external monitor to provide remote inspection information to an appropriate third-party entity.

As an example, remote inspection information that includes a status of one or more components of an autonomous vehicle can be provided to a highway transportation administration, port authority, or aviation administration to ensure compliance with rules and/or regulations concerning operation of an autonomous vehicle over a highway transportation infrastructure, maritime transportation infrastructure, or air transportation infrastructure, respectively.

As another example, remote inspection information that includes a status of a location, speed, and transportation route of an autonomous vehicle can be provided to a law enforcement entity to assist the law enforcement entity in monitoring vehicular traffic in its jurisdiction. Additionally, or alternatively, remote inspection information that includes a status of a cargo attached to an autonomous vehicle (e.g., cargo weight) can be provided to a tax assessment entity when the autonomous vehicle crosses a boundary from one state to another. Additionally, or alternatively, remote inspection information that includes emissions information of an autonomous vehicle can be provided to an environmental protection entity to ensure compliance with emissions standards.

As yet another example, remote inspection information that includes a status of a surrounding environment of an autonomous vehicle can be provided to a highway transportation administration to report segments of a road that are in need of repair and/or lack a safety lane. Additionally, or alternatively, remote inspection information that includes a status of a surrounding environment can be provided to a law enforcement entity to report an accident.

In some implementations, the service provider can control an autonomous vehicle and/or an external monitor to provide remote inspection information to a third-party entity at one or more times. For example, remote inspection information associated with an autonomous vehicle can be provided to a law enforcement entity each time the autonomous vehicle exits a transfer hub onto a transportation route. As another example, remote inspection information associated with an autonomous vehicle can be provided to an environmental protection entity at a predetermined time interval and/or if diagnostics information associated with the autonomous vehicle indicates an emissions spike. As yet another example, remote inspection information associated with an autonomous vehicle can be provided to a tax assessment entity each time the autonomous vehicle crosses into a different tax jurisdiction.

The systems and methods described herein may provide a number of technical effects and benefits. For instance, instead of stopping at weigh stations intermittently along a route, inspections and weigh-ins can be performed during transfer at a transfer hub and/or in real-time as an autonomous vehicle is travelling from a first transfer hub to a second transfer hub. By utilizing diagnostics sensors and communications tools on-board an autonomous vehicle, as well as external monitors, diagnostics information associated with the autonomous vehicle can be generated and used to determine remote inspection information that can be provided to a remote third-party enforcement entity. Moreover, by generating an inspection report using up-to-date diagnostics information, the third-party entity can be provided with more accurate inspection information associated with an autonomous vehicle.

The systems and methods described herein may also provide resulting improvements to computing technology tasked with providing a vehicle service and/or managing a fleet of vehicles to provide a vehicle service. For example, the systems and methods described herein may provide improvements in a utilization of the fleet of vehicles for providing the vehicle service, resulting in greater throughput and reduced energy expenditure by avoiding intermittent stops along a route.

Reference now will be made in detail to embodiments, one or more example(s) of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Figure 1:
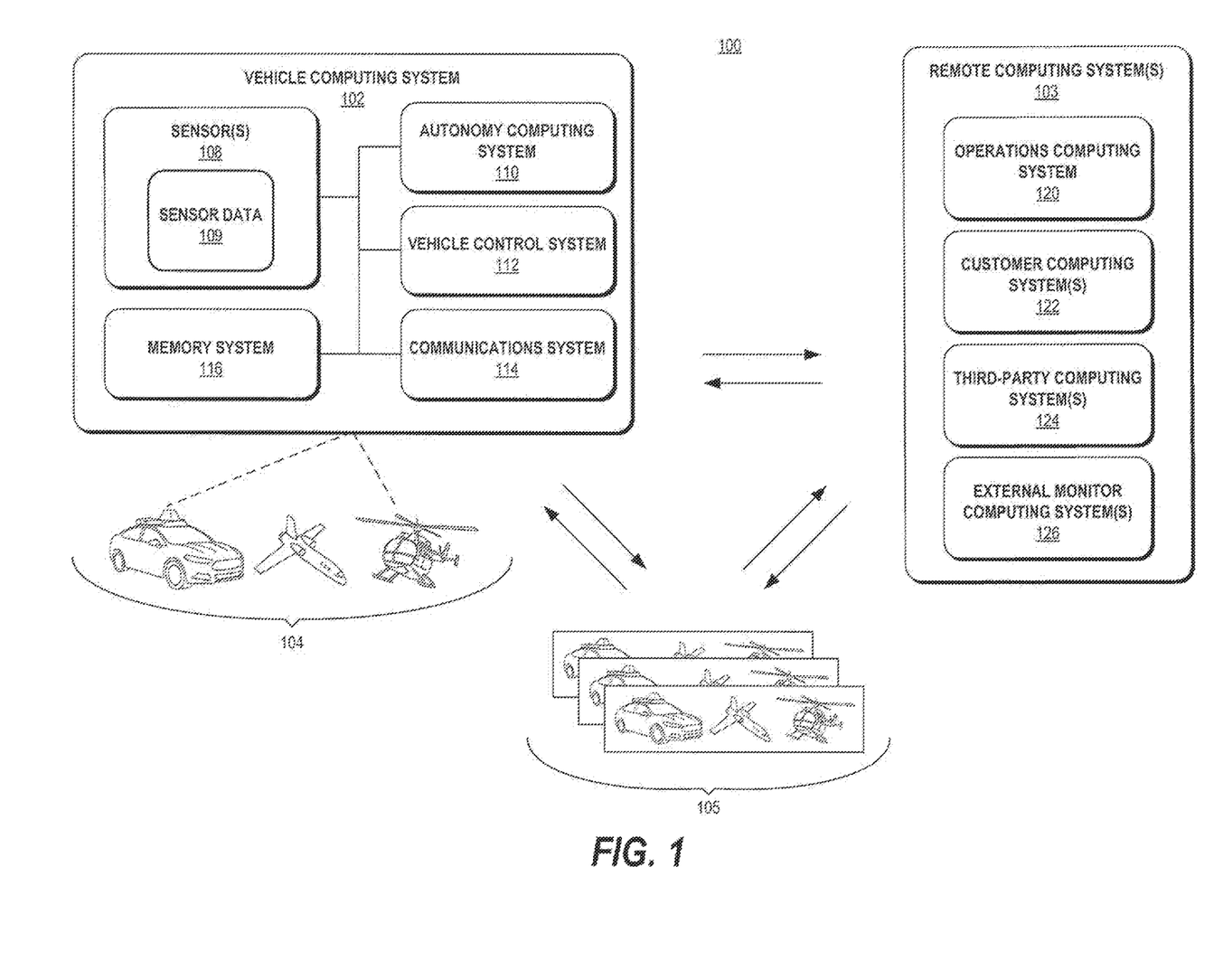
FIG. 1 depicts an example system overview according to example embodiments of the present disclosure.

With reference now to the FIGS., example embodiments of the present disclosure will be discussed in further detail. FIG. 1 depicts an example system 100 according to example embodiments of the present disclosure. The system 100 can include a vehicle computing system 102 associated with a vehicle 104. The system 100 can also include one or more additional vehicle(s) 105, each including a respective vehicle computing system (not shown).

In some implementations, the vehicle 104 can be part of a fleet of vehicles managed by the operations computing system 120. Additionally, one or more of vehicles among the one or more additional vehicles 105 can be part of the fleet of vehicles managed by the operations computing system 120.

In some implementations, the system 100 can include one or more remote computing system(s) 103 that are remote from the vehicle 104 and the additional vehicle(s) 105. The remote computing system(s) 103 can include an operations computing system 120, one or more customer computing system(s) 122, one or more third-party computing system(s) 124, and one or more external monitor computing system(s) 126. The remote computing system(s) 103 can be separate from one another or share computing device(s).

The operations computing system 120 can manage the vehicle 104 via the vehicle computing system 102. Additionally, the operations computing system 120 can manage the one or more additional vehicle 105 via a respective vehicle computing system. The operations computing system 120 can obtain data indicative of a service request from a customer, for example, via the customer computing system 122. The operations computing system 120 can select the vehicle 104 (or one of the additional vehicles 105) to provide the vehicle service requested by the customer. The operations computing system 120 can control the vehicle 104 to provide remote inspection information to the one or more third-party computing system(s) 124.

The vehicle 104 incorporating the vehicle computing system 102 can be a ground-based autonomous vehicle (e.g., car, truck, bus), an air-based autonomous vehicle (e.g., airplane, drone, helicopter, or other aircraft), or other types of vehicles (e.g., watercraft). The vehicle 104 can be an autonomous vehicle that can drive, navigate, operate, etc. with minimal and/or no interaction from a human driver.

The vehicle computing system 102 can include one or more computing device(s) located on-board the vehicle 104 (e.g., located on and/or within the vehicle 104). The computing device(s) can include various components for performing various operations and functions. For instance, the computing device(s) can include one or more processor(s) and one or more tangible, non-transitory, computer readable media. The one or more tangible, non-transitory, computer readable media can store instructions that when executed by the one or more processor(s) cause the vehicle 104 (e.g., its computing system, one or more processors, etc.) to perform operations and functions, such as those described herein.

As shown in FIG. 1, the vehicle 104 can include one or more sensors 108, an autonomy computing system 110, a vehicle control system 112, a communications system 114, and a memory system 116. One or more of these systems can be configured to communicate with one another via a communication channel. The communication channel can include one or more data buses (e.g., controller area network (CAN)), on-board diagnostics connector (e.g., OBD-II), and/or a combination of wired and/or wireless communication links. The on-board systems can send and/or receive data, messages, signals, etc. amongst one another via the communication channel.

The sensor(s) 108 can be configured to acquire sensor data 109 associated with one or more objects that are proximate to the vehicle 104 (e.g., within a field of view of one or more of the sensor(s) 108). The sensor(s) 108 can include a Light Detection and Ranging (LIDAR) system, a Radio Detection and Ranging (RADAR) system, one or more cameras (e.g., visible spectrum cameras, infrared cameras, etc.), motion sensors, and/or other types of imaging capture devices and/or sensors. The sensor data 109 can include image data, radar data, LIDAR data, and/or other data acquired by the sensor(s) 108. The object(s) can include, for example, pedestrians, vehicles, bicycles, and/or other objects. The object(s) can be located in front of, to the rear of, and/or to the side of the vehicle 104. The sensor data 109 can be indicative of locations associated with the object(s) within the surrounding environment of the vehicle 104 at one or more times. The sensor(s) 108 can provide the sensor data 109 to the autonomy computing system 110.

Figure 2:
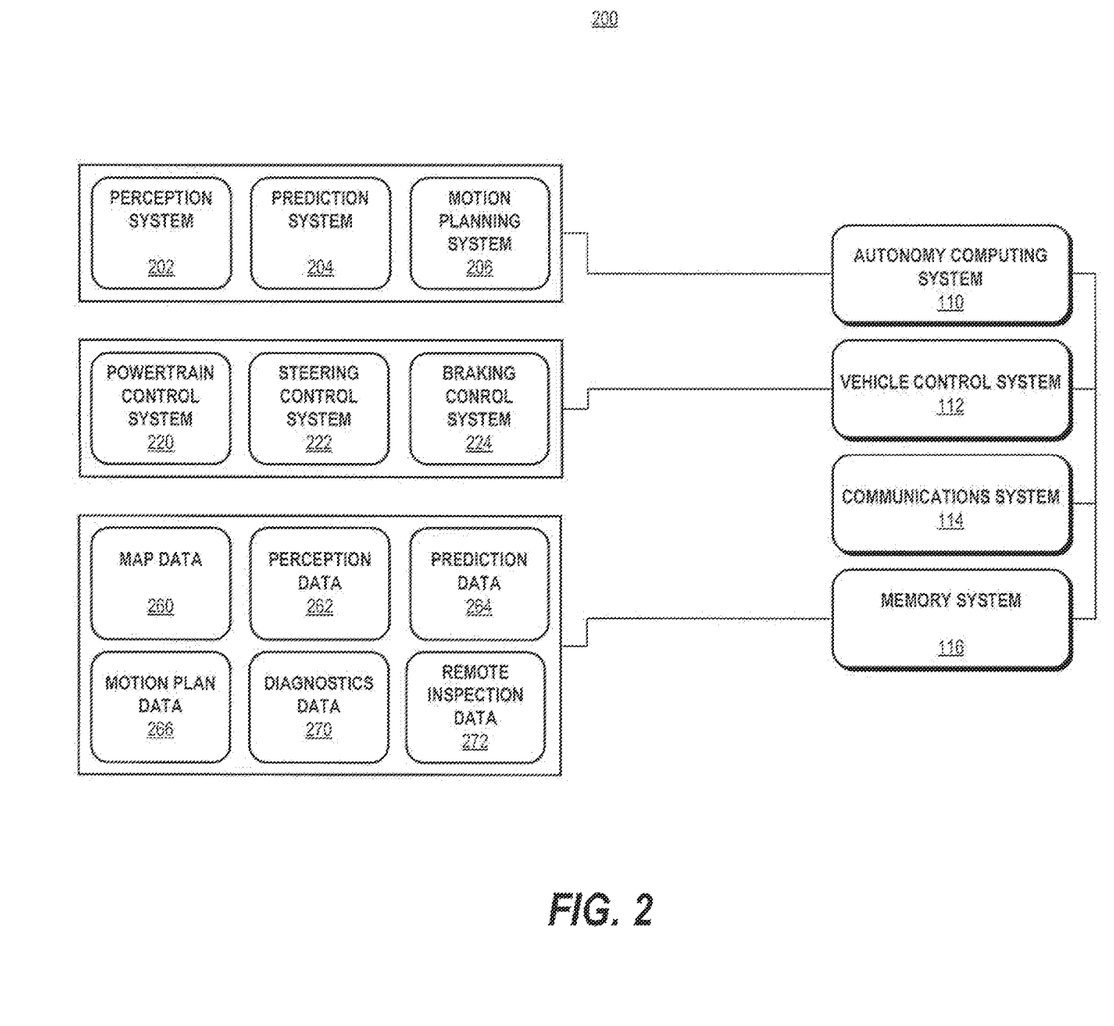
FIG. 2 depicts an example vehicle computing system according to example embodiments of the present disclosure.

As shown in FIG. 2, the autonomy computing system 110 can include a perception system 202, a prediction system 204, a motion planning system 206, and/or other systems that cooperate to perceive the surrounding environment of the vehicle 104 and determine a motion plan for controlling the motion of the vehicle 104 accordingly. For example, the autonomy computing system 110 can receive the sensor data 109 from the sensor(s) 108, attempt to comprehend the surrounding environment by performing various processing techniques on the sensor data 109 (and/or other data), and generate an appropriate motion plan through such surrounding environment. The autonomy computing system 110 can control the one or more vehicle control systems 112 to operate the vehicle 104 according to the motion plan.

The autonomy computing system 110 can identify one or more objects that are proximate to the vehicle 104 based at least in part on the sensor data 109 and/or the map data 260. For instance, the perception system 202 can perform various processing techniques on the sensor data 109 to determine perception data 262 that is descriptive of a current state of one or more object(s) that are proximate to the vehicle 104. The prediction system 204 can create prediction data 264 associated with each of the respective one or more object(s) proximate to the vehicle 104. The prediction data 264 can be indicative of one or more predicted future locations of each respective object. The motion planning system 206 can determine a motion plan for the vehicle 104 based at least in part on the prediction data 264 (and/or other data), and save the motion plan as motion plan data 266. The motion plan data 266 can include vehicle actions with respect to the object(s) proximate to the vehicle 104 as well as the predicted movements. The motion plan data 266 can include a planned trajectory, speed, acceleration, etc. of the vehicle 104.

The motion planning system 206 can provide at least a portion of the motion plan data 266 that indicates one or more vehicle actions, a planned trajectory, and/or other operating parameters to the vehicle control system 112 to implement the motion plan for the vehicle 104. For instance, the vehicle 104 can include a mobility controller configured to translate the motion plan data 266 into instructions. By way of example, the mobility controller can translate the motion plan data 266 into instructions to adjust the steering of the vehicle 104 "X" degrees, apply a certain magnitude of braking force, etc. The mobility controller can send one or more control signals to the responsible vehicle control sub-system (e.g., powertrain control system 220, steering control system 222, braking control system 224) to execute the instructions and implement the motion plan.

The communications system 114 can allow the vehicle computing system 102 (and its computing system(s)) to communicate with one or more other computing systems (e.g., remote computing system(s) 103, additional vehicle(s) 105). The vehicle computing system 102 can use the communications system 114 to communicate with the operations computing system 120 and/or one or more other remote computing system(s) (e.g., third-party computing system(s) 124, external monitor computing system(s) 126) over one or more networks (e.g., via one or more wireless signal connections). In some implementations, the communications system 114 can allow communication among one or more of the system(s) on-board the vehicle 104. The communications system 114 can include any suitable sub-systems for interfacing with one or more network(s), including, for example, transmitters, receivers, ports, controllers, antennas, and/or other suitable sub-systems that can help facilitate communication.

The memory system 116 of the vehicle 104 can include one or more memory devices located at the same or different locations (e.g., on-board the vehicle 104, distributed throughout the vehicle 104, off-board the vehicle 104, etc.). The vehicle computing system 102 can use the memory system 116 to store and retrieve data/information. For instance, the memory system 116 can store map data 260, perception data 262, prediction data 264, motion plan data 266, diagnostics data 270, and remote inspection data 272.

The map data 260 can include information regarding: an identity and location of different roadways, road segments, buildings, or other items or objects (e.g., lampposts, crosswalks, curbing, etc.); a location and direction of traffic lanes (e.g., the location and direction of a parking lane, a turning lane, a bicycle lane, or other lanes within a particular roadway or other travel way and/or one or more boundary markings associated therewith); and/or any other data that assists the vehicle computing system 102 in comprehending and perceiving its surrounding environment and its relationship thereto.

The vehicle computing system 102 can autonomously generate diagnostics information corresponding to one or more systems on-board the vehicle 104 and/or information corresponding to an environment in which the vehicle 104 operates. Additionally, and/or alternatively, the vehicle computing system can obtain diagnostics information associated with the vehicle 104 from the one or more external monitor computing system(s) 126. The vehicle computing system 102 can store the diagnostics information as the diagnostics data 270.

The vehicle computing system 102 can autonomously determine remote inspection information based on the diagnostics data 270, and store the remote inspection information as remote inspection data 272. The vehicle computing system 102 can provide the remote inspection information to one or more remote computing system(s) 103 (e.g., operations computing system 120, third-party computing system(s) 124, external monitor computing system(s) 126) at one or more times.

Figure 3:
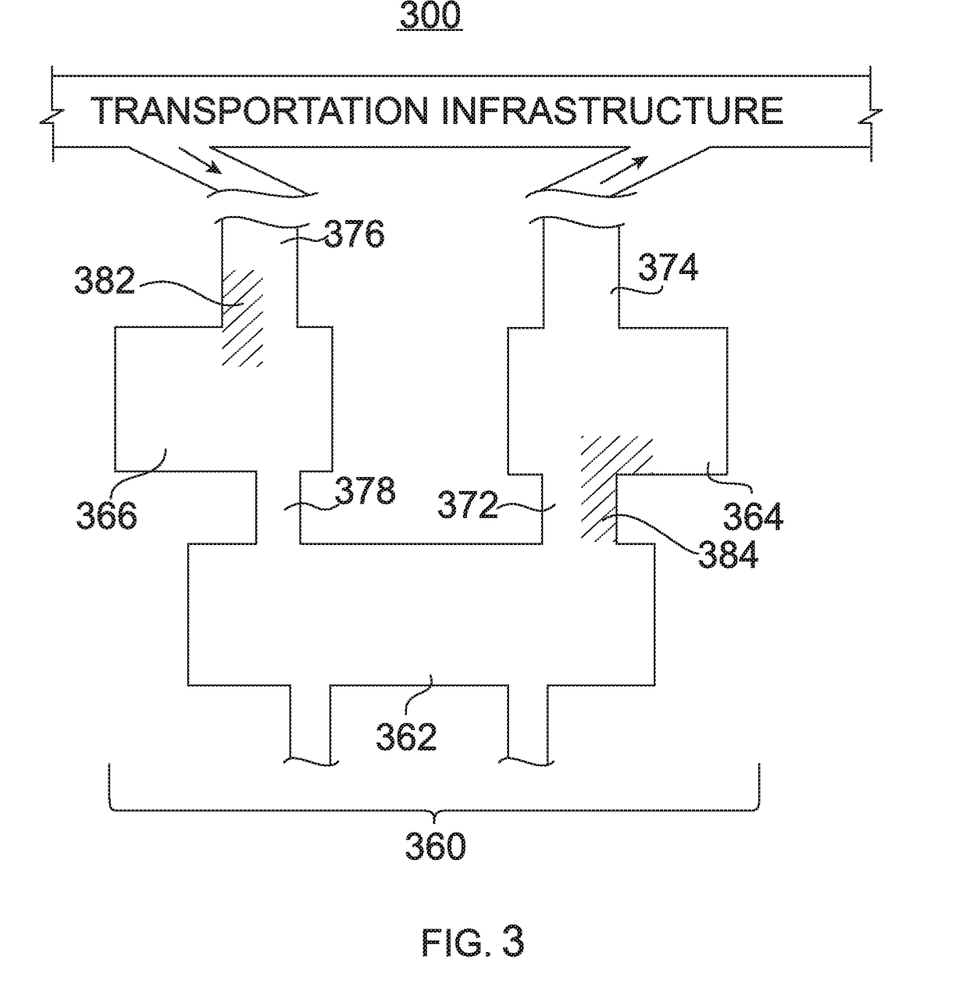
FIG. 3 depicts an example transfer hub according to example embodiments of the present disclosure.

FIG. 3 depicts a diagram 300 of a transfer hub 360 according to example embodiments of the present disclosure. The transfer hub 360 can include a loading zone 362, launch zone 364, and landing zone 366. The loading zone 362 can be connected to the launch zone 364 via an access route 372, and connected to the landing zone 366 via an access route 378. The launch zone 364 can be connected to a highway via an on-ramp 374, and the landing zone can be connected to the highway via an off-ramp 376. An autonomous vehicle can exit the transfer hub 360 via the on-ramp 374, and the autonomous vehicle can enter the transfer hub 360 via the off-ramp 376.

The transfer hub 360 can include a first external monitor 382. The vehicle computing system 102, and/or the operations computing system 120 can control the vehicle 104 to travel to a vicinity of the first external monitor 382 when the vehicle 104 enters the transfer hub 360 via the off-ramp 276.

In some implementations, the first external monitor 382 (e.g., external monitor computing system 126 corresponding to the first external monitor 382) can inspect the vehicle 104 to generate diagnostics information associated with the vehicle 104. Additionally, or alternatively, the first external monitor 382 can obtain diagnostics information from the vehicle 104. The external monitor 382 can determine remote inspection information associated with the vehicle 104 based on the diagnostics information, and provide the remote inspection information to a third-party computing system 124.

In some implementations, the first external monitor 382 can inspect the vehicle 104 to generate diagnostics information associated with the vehicle 104, and provide the diagnostics information to the vehicle computing system 102. The vehicle computing system 102 can store the diagnostics information and/or determine remote inspection information associated with the vehicle 104 based on the diagnostics information. The vehicle computing system 102 can provide the remote inspection information to a third-party computing system 124.

The transfer hub 360 can include a second external monitor 384. The vehicle computing system 102, and/or the operations computing system 120 can control the vehicle 104 to travel to a vicinity of the second external monitor 384 before the vehicle 104 exits the transfer hub 360 via the on-ramp 374.

In some implementations, the second external monitor 384 (e.g., external monitor computing system 126 corresponding to the second external monitor 384) can inspect the vehicle 104 to generate diagnostics information associated with the vehicle 104. Additionally, or alternatively, the second external monitor 384 can obtain diagnostics information from the vehicle 104. The external monitor 384 can determine remote inspection information associated with the vehicle 104 based on the diagnostics information, and provide the remote inspection information to a third-party computing system 124.

In some implementations, the second external monitor 384 can inspect the vehicle 104 to generate diagnostics information associated with the vehicle 104, and provide the diagnostics information to the vehicle computing system 102. The vehicle computing system 102 can store the diagnostics information and/or determine remote inspection information associated with the vehicle 104 based on the diagnostics information. The vehicle computing system 102 can provide the remote inspection information to a third-party computing system 124.

Figure 4:
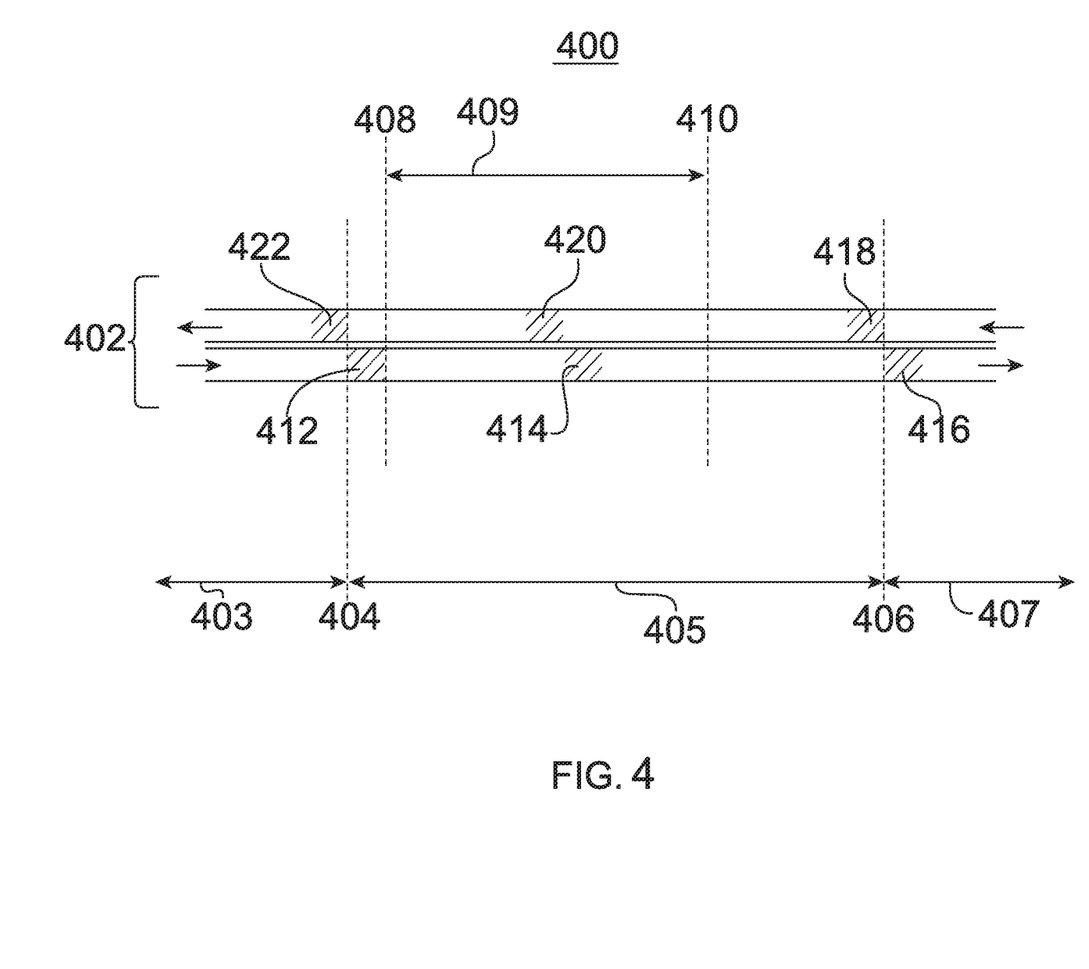
FIG. 4 depicts an example transportation route according to example embodiments of the present disclosure.

FIG. 4 depicts a diagram 400 of a transportation route 402 according to example embodiments of the present disclosure. The transportation route 402 can be part of a highway transportation infrastructure administered by a highway transportation administration. The transportation route 402 can extend across regions 403, 405, 407, and 409, that are separated by boundaries 404, 406, 408, and 410. The regions 403, 405, and 407 can each correspond to, for example, different government entities, and the boundaries 404 and 406 can each correspond to, for example, political boundaries. The boundary 404 can separate region 403 and region 405, and the boundary 406 can separate region 405 and region 407. The region 409 can correspond to, for example, a region where wireless communication is unavailable or unreliable. The region 409 can be bounded by the boundaries 408 and 410.

The transportation route 402 can include an external monitor 412 located at the boundary 404, and an external monitor 416 located at the boundary 406. When the vehicle 104 is travelling from region 403 to region 407 on the transportation route 402, the vehicle 104 can travel within a vicinity of the external monitor 412 when the vehicle 104 crosses the boundary 404, and within a vicinity of the external monitor 416 when the vehicle 104 crosses the boundary 406. The vehicle 104 can autonomously provide remote inspection information associated with it to the external monitors 412 and 416 when the vehicle 104 is within a vicinity of the external monitors 412 and 416, respectively.

As an example, when the vehicle 104 is travelling from region 403 to region 407, the vehicle 104 can provide remote inspection information including a weight of an attached cargo item to the external monitor 412 when the vehicle 104 crosses the boundary 404. The external monitor 412 can provide the remote inspection information received from the vehicle 104 to a tax assessment entity associated with the region 405.

As another example, when the vehicle 104 is travelling from region 403 to region 407, the vehicle 104 can provide remote inspection information including a weight of an attached cargo item to the external monitor 416 when the vehicle 104 crosses the boundary 406. The external monitor 416 can provide the remote inspection information received from the vehicle 104 to a tax assessment entity associated with region 407.

The transportation route 402 can include an external monitor 422 located at the boundary 404, and an external monitor 418 located at the boundary 406. When the vehicle 104 is travelling from region 407 to region 403 on the transportation route 402, the vehicle 104 can travel within a vicinity of the external monitor 418 when the vehicle 104 crosses the boundary 406, and within a vicinity of the external monitor 422 when the vehicle 104 crosses the boundary 404. The vehicle 104 can autonomously provide remote inspection information associated with it to the external monitors 418 and 422 when the vehicle 104 is within a vicinity of the external monitors 418 and 422, respectively.

As an example, when the vehicle 104 is travelling from region 407 to region 403, the vehicle 104 can provide remote inspection information including a weight of an attached cargo item to the external monitor 418 when the vehicle 104 crosses the boundary 406. The external monitor 418 can provide the remote inspection information received from the vehicle 104 to a tax assessment entity associated with the region 405.

As another example, when the vehicle 104 is travelling from region 407 to region 403, the vehicle 104 can provide remote inspection information including a weight of an attached cargo item to the external monitor 422 when the vehicle 104 crosses the boundary 404. The external monitor 422 can provide the remote inspection information received from the vehicle 104 to a tax assessment entity associated with region 403.

In some implementations, the vehicle computing system 102, and/or the operations computing system 120 can control the vehicle 104 to wirelessly provide remote inspection information to a third-party entity at periodic intervals along the transportation route 402. For example, the vehicle 104 can provide remote inspection information including a location and speed associated with the vehicle 104 to a law enforcement entity to assist the law enforcement entity in monitoring vehicular traffic in its jurisdiction. When the vehicle 104 located in the region 403, the vehicle 104 can provide such remote inspection information to a law enforcement entity associated with the region 403; when the vehicle 104 located in the region 405, the vehicle 104 can provide such remote inspection information to a law enforcement entity associated with the region 405; and when the vehicle 104 located in the region 407, the vehicle 104 can provide such remote inspection information to a law enforcement entity associated with the region 407.

The transportation route 402 can include external monitors 414 and 420 located within the region 409. The external monitors 414 and 420 can include a dedicated and/or physical connection to a communications network to provide remote inspection information to a third-party entity. For example, when the vehicle 104 is located in the region 409 that is included in the region 405, the vehicle 104 can be unable to provide remote inspection information including a location and speed associated with the vehicle 104 to a law enforcement entity associated with the region 405 because wireless communication is unavailable or unreliable in the region 409. The vehicle 104 can instead travel within a vicinity of the external monitor 414 when travelling from the region 403 to the region 407, and travel within a vicinity of the external monitor 420 when travelling from the region 407 to the region 403. The vehicle 104 can provide remote inspection information including a location and speed associated with the vehicle 104 to the external monitors 414 and 420, and the external monitors 414 and 420 can provide the remote inspection information to a law-enforcement entity associated with the region 405.

Figure 5A:
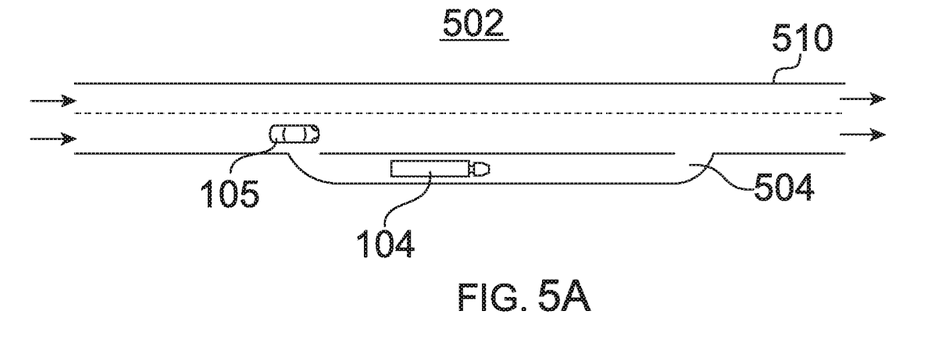
FIGS. 5A-5C depict determining remote inspection information using a mobile external monitor according to example embodiments of the present disclosure.
Figure 5B:
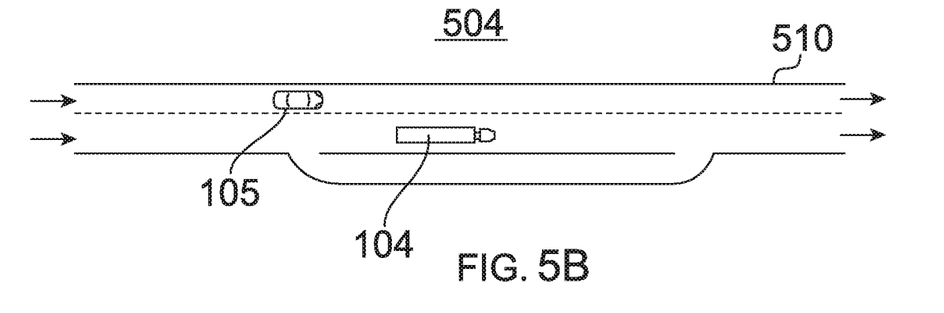
Figure 5C:
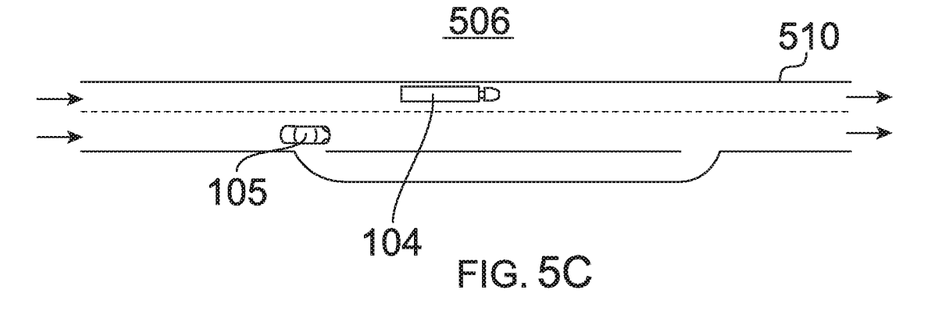

FIGS. 5A, 5B, and 5C depict diagrams 502, 504, and 506 of determining remote inspection information using a mobile external monitor according to exemplary embodiments of the present disclosure. In FIG. 5A, the vehicle 104 can detect a fault, for example, with a tire pressure sensor of the vehicle 104, when travelling via the transportation route 510. In response to the fault, the vehicle 104 can pull-over in the safety lane 504 and request a mobile inspection of its tires. The vehicle 105 can be selected to travel to a vicinity of the vehicle 104 to inspect one or more tires of the vehicle 104. The vehicle 105 can be affixed with an external monitor that can inspect the vehicle 104. Additionally, or alternatively, the vehicle 105 can use one or more sensors onboard the vehicle 105 to inspect the vehicle 104. The vehicle 105 can inspect the vehicle 104 to generate diagnostics information associated with the vehicle 104, and provide the diagnostics information to the vehicle 104. Additionally, or alternatively, the vehicle 105 can determine remote inspection information associated with the vehicle 104, and provide the remote inspection information to a third-party computing system 124.

In FIG. 5B, the vehicle 104 can detect a fault, for example, with a tire pressure sensor of the vehicle 104, when travelling via the transportation route 510. In response to the fault, the vehicle 104 can travel in a right-side lane of the transportation route 510, and request a mobile inspection of its left-side tires. The vehicle 105 can be selected to travel to a vicinity of the vehicle 104 to inspect one or more tires of the vehicle 104. The vehicle 105 can be affixed with an external monitor that can inspect the vehicle 104. Additionally, or alternatively, the vehicle 105 can use one or more sensors onboard the vehicle 105 to inspect the vehicle 104. The vehicle 105 can travel in a left-side lane of the transportation route 510 and inspect a left-side of the vehicle 104 to generate diagnostics information associated with the vehicle 104. The vehicle 105 can provide the diagnostics information to the vehicle 104. Additionally, or alternatively, the vehicle 105 can determine remote inspection information associated with the vehicle 104, and provide the remote inspection information to a third-party computing system 124.

In FIG. 5C, the vehicle 104 can detect a fault, for example, with a tire pressure sensor of the vehicle 104, when travelling via the transportation route 510. In response to the fault, the vehicle 104 can travel in a left-side lane of the transportation route 510, and request a mobile inspection of its right-side tires. The vehicle 105 can be selected to travel to a vicinity of the vehicle 104 to inspect one or more tires of the vehicle 104. The vehicle 105 can be affixed with an external monitor that can inspect the vehicle 104. Additionally, or alternatively, the vehicle 105 can use one or more sensors onboard the vehicle 105 to inspect the vehicle 104. The vehicle 105 can travel in a right-side lane of the transportation route 510 and inspect a right-side of the vehicle 104 to generate diagnostics information associated with the vehicle 104. The vehicle 105 can provide the diagnostics information to the vehicle 104. Additionally, or alternatively, the vehicle 105 can determine remote inspection information associated with the vehicle 104, and provide the remote inspection information to a third-party computing system 124.

Figure 6:
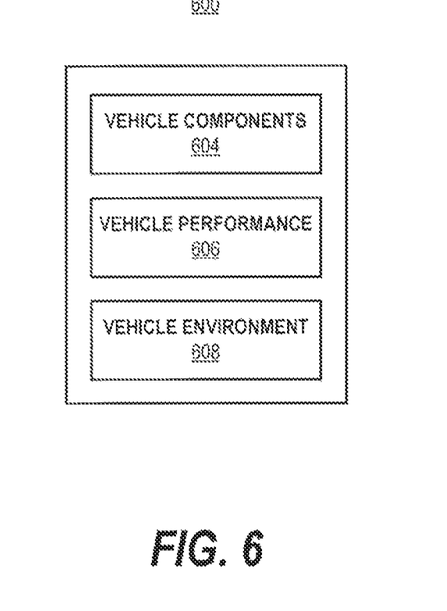
FIG. 6 depicts example remote inspection information according to example embodiments of the present disclosure.

FIG. 6 depicts a diagram 600 of remote inspection information 602 according to example embodiments of the present disclosure. The remote inspection information 602 can be associated with the vehicle 104, and can indicate a vehicle components status 604, vehicle performance status 606, and vehicle environment status 608 associated with the vehicle 104. The vehicle components status 604 can correspond to, for example, a status of the sensor(s) 108, autonomy computing system 110, vehicle control system 112, communications system 114, and memory system 116. The vehicle performance status 606 can correspond to, for example, a speed, distance travelled, fuel consumption, weight, coolant levels, and brake wear associated with the vehicle 104. The vehicle environment status 608 can correspond to, for example, road conditions, weather conditions, and traffic conditions that are determined based on the sensor data 109.

Figure 7:
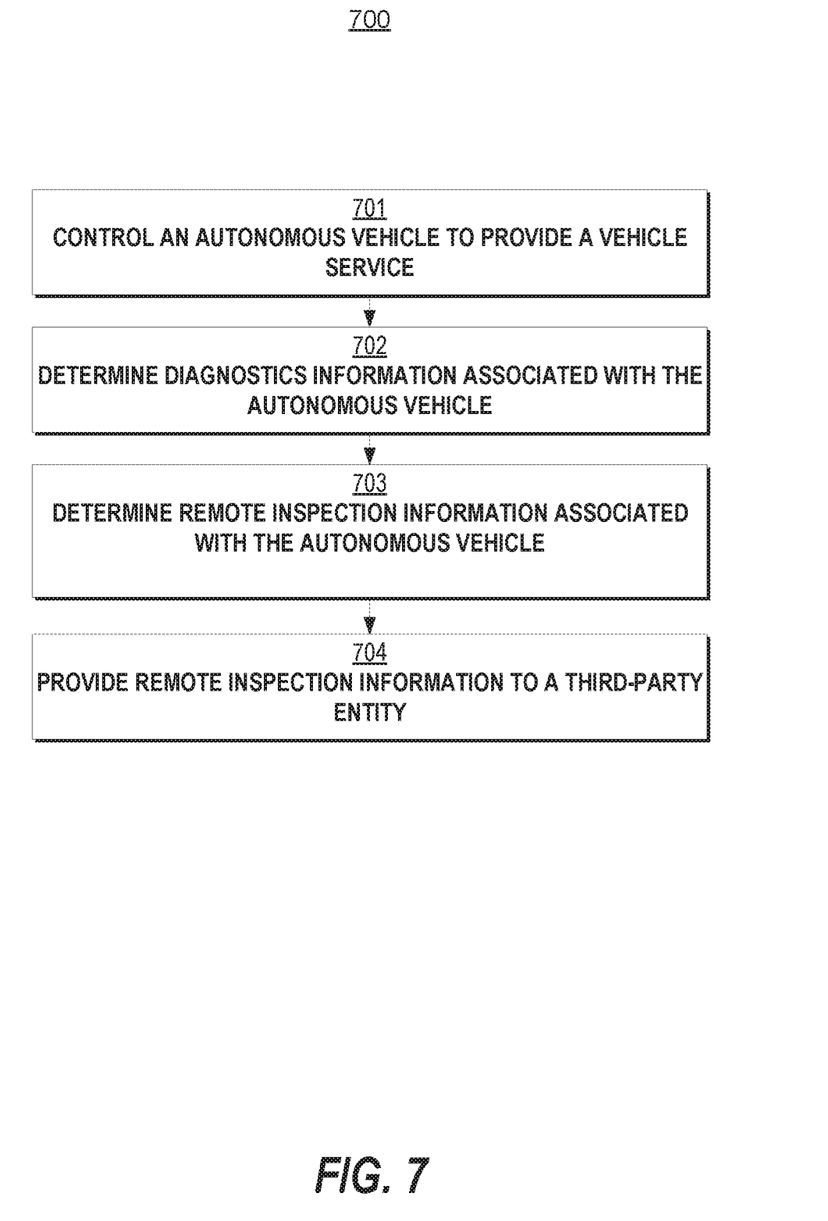
FIG. 7 depicts a flow diagram of controlling an autonomous vehicle to provide a vehicle service according to example embodiments of the present disclosure.

FIG. 7 depicts a flow diagrams of an example method 700 for controlling an autonomous vehicle according to example embodiments of the present disclosure. One or more portion(s) of the method 700 can be implemented as operations by one or more computing system(s) such as, for example, the computing system(s) 102, 120, 801, and 810 shown in FIGS. 1, 2, and 8. Moreover, one or more portion(s) of the method 700 can be implemented as an algorithm on the hardware components of the system(s) described herein (e.g., as in FIGS. 1, 2, and 8) to, for example, provide remote inspection information to a third-party entity. FIG. 7 depicts elements performed in a particular order for purposes of illustration and discussion. Those of ordinary skill in the art, using the disclosures provided herein, will understand that the elements of any of the methods (e.g., of FIG. 7) discussed herein can be adapted, rearranged, expanded, omitted, combined, and/or modified in various ways without deviating from the scope of the present disclosure.

At (701), the method 700 can include controlling an autonomous vehicle to provide a vehicle service. For example, the vehicle computing system 102 can control the vehicle 104 to provide a vehicle service to a customer entity.

At (702), the method 700 can include determining diagnostics information associated with the autonomous vehicle. For example, the vehicle computing system 102 can determine vehicle diagnostics information associated with the vehicle 104. The vehicle computing system 102 can determine the vehicle diagnostics information by autonomously generating diagnostics information associated with the vehicle 104. Additionally, or alternatively, the vehicle computing system 102 can determine the vehicle diagnostics information by controlling the vehicle 104 to ravel to a vicinity of an external monitor that can generate diagnostics information associated with the vehicle 104. The external monitor can include one or more of an automated inspection device and a human inspector. The external monitor can be located at one or more of a transfer hub and along a transportation route of a transportation network used to provide the vehicle service to the customer entity. In some implementations, the external monitor can be mobile, and affixed to an additional vehicle 105. In some implementations, the external monitor can include on or more sensors onboard the vehicle 105. The operations computing system 120 can control the vehicle 105 to travel to a vicinity of the vehicle 104 and generate diagnostics information associated with the vehicle 104. The operations computing system 120 can control the vehicle 105 in response to a request by the vehicle 104 for an external monitor to generate diagnostics information associated with the vehicle 104.

At (703), the method 700 can include determining remote inspection information associated with the autonomous vehicle. For example, the vehicle computing system 102 can determine remote inspection information associated with the vehicle 104, that includes an assessment of one or more categories pertaining to a third-party entity, based on vehicle diagnostics information associated with the vehicle 104. The vehicle computing system 102 can determine one or more categories pertaining to the third-party entity, analyze the vehicle diagnostics information associated with the vehicle 104 to determine an assessment for each of the one or more categories pertaining to the third-party entity, and generate remote inspection information based at least in part on the assessment for each of the one or more categories pertaining to the third-party entity.

At (704), the method 700 can include providing remote inspection information to a third-party entity. For example, the vehicle computing system 102 can provide remote inspection information associated with the vehicle 104 to a third-party computing system 124 corresponding to a third-party entity. The vehicle computing system 102 can provide the remote inspection information to a remote third-party entity at one or more times when providing the vehicle service to the customer entity.

Figure 8:
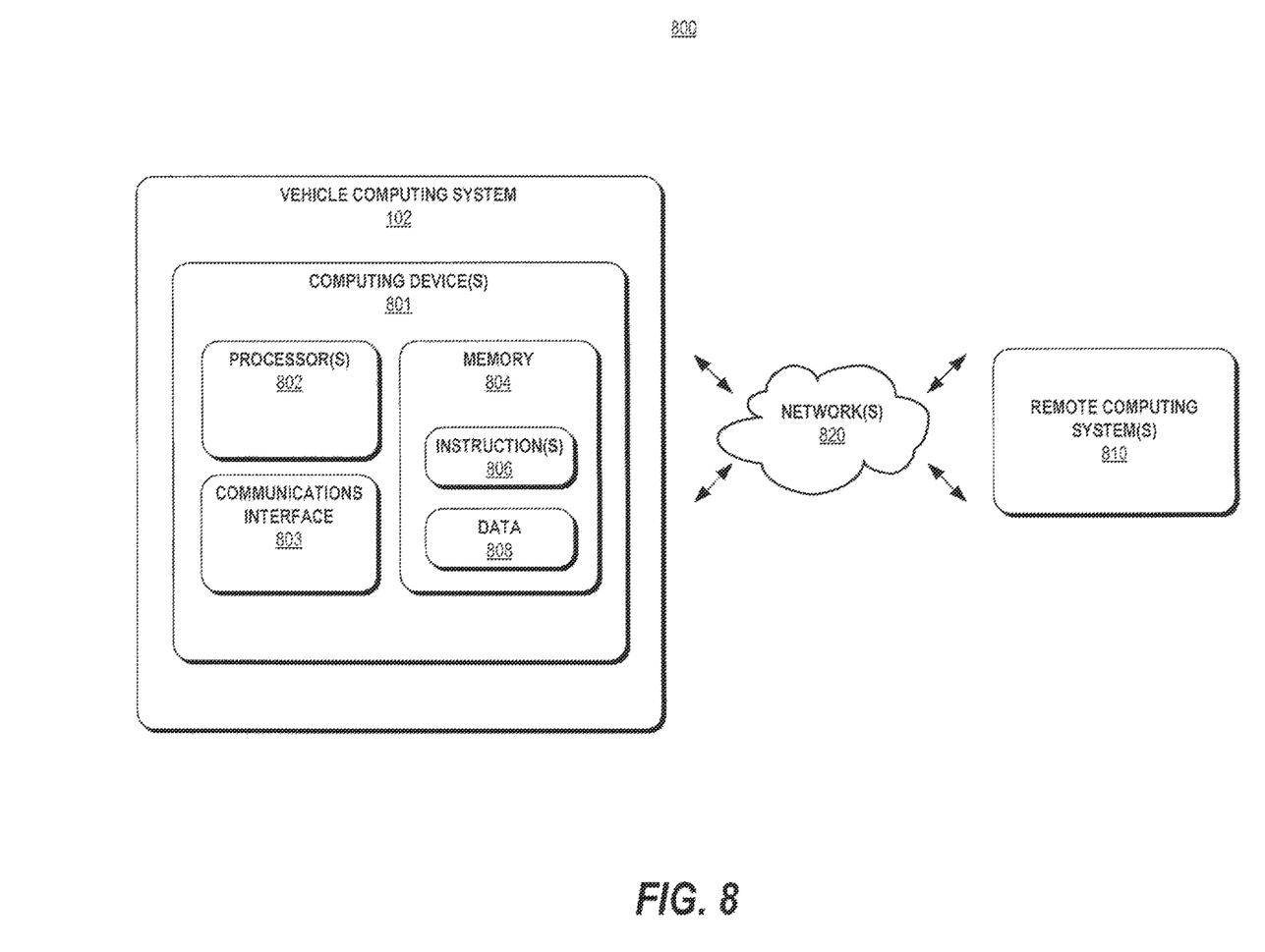
FIG. 8 depicts example system components according to example embodiments of the present disclosure.

FIG. 8 depicts an example computing system 800 according to example embodiments of the present disclosure. The example system 800 illustrated in FIG. 8 is provided as an example only. The components, systems, connections, and/or other aspects illustrated in FIG. 8 are optional and are provided as examples of what is possible, but not required, to implement the present disclosure. The example system 800 can include the vehicle computing system 102 of the vehicle 104 and, in some implementations, remote computing system(s) 810 including one or more remote computing system(s) that are remote from the vehicle 104 (e.g., operations computing system 120) that can be communicatively coupled to one another over one or more networks 820. The remote computing system 810 can be associated with a central operations system and/or an entity associated with the vehicle 104 such as, for example, a vehicle owner, vehicle manager, fleet operator, service provider, etc.

The computing device(s) 801 of the vehicle computing system 102 can include processor(s) 802 and a memory 804. The one or more processors 802 can be any suitable processing device (e.g., a processor core, a microprocessor, an ASIC, a FPGA, a controller, a microcontroller, etc.) and can be one processor or a plurality of processors that are operatively connected. The memory 804 can include one or more non-transitory computer-readable storage media, such as RAM, ROM, EEPROM, EPROM, one or more memory devices, flash memory devices, etc., and combinations thereof.

The memory 804 can store information that can be accessed by the one or more processors 802. For instance, the memory 804 (e.g., one or more non-transitory computer-readable storage mediums, memory devices) on-board the vehicle 104 can include computer-readable instructions 806 that can be executed by the one or more processors 802. The instructions 806 can be software written in any suitable programming language or can be implemented in hardware. Additionally, or alternatively, the instructions 806 can be executed in logically and/or virtually separate threads on processor(s) 802.

For example, the memory 804 on-board the vehicle 104 can store instructions 806 that when executed by the one or more processors 802 on-board the vehicle 104 cause the one or more processors 802 (the vehicle computing system 102) to perform operations such as any of the operations and functions of the vehicle computing system 102, as described herein, one or more operations of method 800, and/or any other operations and functions of the vehicle computing system 102, as described herein.

The memory 804 can store data 808 that can be obtained, received, accessed, written, manipulated, created, and/or stored. The data 808 can include, for instance, data associated with perception, prediction, motion plan, maps, vehicle diagnostics, remote inspection and/or other data/information as described herein. In some implementations, the computing device(s) 801 can obtain data from one or more memory device(s) that are remote from the vehicle 104.

The computing device(s) 801 can also include a communication interface 803 used to communicate with one or more other system(s) on-board the vehicle 104 and/or a remote computing device that is remote from the vehicle 104 (e.g., of remote computing system(s) 810). The communication interface 803 can include any circuits, components, software, etc. for communicating via one or more networks (e.g., 820). In some implementations, the communication interface 803 can include, for example, one or more of a communications controller, receiver, transceiver, transmitter, port, conductors, software, and/or hardware for communicating data.

The network(s) 820 can be any type of network or combination of networks that allows for communication between devices. In some embodiments, the network(s) can include one or more of a local area network, wide area network, the Internet, secure network, cellular network, mesh network, peer-to-peer communication link, and/or some combination thereof, and can include any number of wired or wireless links. Communication over the network(s) 820 can be accomplished, for instance, via a communication interface using any type of protocol, protection scheme, encoding, format, packaging, etc.

The remote computing system 810 can include one or more remote computing devices that are remote from the vehicle computing system 102. The remote computing devices can include components (e.g., processor(s), memory, instructions, data) similar to that described herein for the computing device(s) 801. Moreover, the remote computing system(s) 810 can be configured to perform one or more operations of the operations computing system 120, as described herein. Moreover, the computing systems of other vehicles described herein can include components similar to that of vehicle computing system 102.

Computing tasks discussed herein as being performed at computing device(s) remote from the vehicle can instead be performed at the vehicle (e.g., via the vehicle computing system), or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

While the present subject matter has been described in detail with respect to specific example embodiments and methods thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method comprising:
   determining, by one or more computing devices, vehicle diagnostics information associated with a first autonomous vehicle;
   determining, by the one or more computing devices, a first region located along a transportation route along which the first autonomous vehicle is or will be travelling;
   determining, by the one or more computing devices, first remote inspection information associated with the first autonomous vehicle based at least in part on the vehicle diagnostics information and a first third-party entity associated with the first region, wherein the first third-party entity is associated with at least one of: (i) a government entity, (ii) a regulatory entity, or (iii) an administrative entity of the first region, and wherein the first remote inspection information comprises an assessment of one or more categories pertaining to the first third-party entity;

providing, by the one or more computing devices, the first remote inspection information to the first third-party entity;

determining, by the one or more computing devices, a second region located along a transportation route along which the first autonomous vehicle is or will be travelling, the second region being different than the first region; determining, by the one or more computing devices, second remote inspection information associated with the first autonomous vehicle based at least in part on the vehicle diagnostics information and a second third-party entity associated with the second region, wherein the second remote inspection information comprises an assessment of one or more categories pertaining to the second third-party entity; and providing, by the one or more computing devices, the second remote inspection information to the second third-party entity.

2. The computer-implemented method of claim 1, wherein determining, by one or more computing devices, the vehicle diagnostics information comprises:

controlling, by the one or more computing devices, the first autonomous vehicle to autonomously generate diagnostics information.

3. The computer-implemented method of claim 1, wherein determining, by one or more computing devices, the vehicle diagnostics information comprises:

controlling, by the one or more computing devices, the first autonomous vehicle to travel to a location of an external monitor that generates the vehicle diagnostics information.

4. The computer-implemented method of claim 3, wherein the external monitor comprises at least one of: (i) an automated inspection device or (ii) a human inspector.

5. The computer-implemented method of claim 3, wherein the external monitor is located at a location, wherein the location comprises at least one of: (i) a transfer hub or (ii) a location along a transportation route.

6. The computer-implemented method of claim 3, further comprising:

controlling, by the one or more computing devices, the first autonomous vehicle to travel to the location of the external monitor at one or more times, wherein the one or more times includes at least one of:

(i) a time at a starting transfer hub before starting a vehicle service, (ii) a time at an intermediate transfer hub or a final transfer hub while the first autonomous vehicle is providing the vehicle service, or (iii) a time at a location along a transportation route while the first autonomous vehicle is providing the vehicle service.

7. The computer-implemented method of claim 1, wherein determining, by one or more computing devices, the vehicle diagnostics information comprises:

controlling, by the one or more computing devices, an external monitor to travel to a location of the first autonomous vehicle; and controlling, by the one or more computing devices, the external monitor to generate the vehicle diagnostics information.

8. The computer-implemented method of claim 7, wherein a second autonomous vehicle comprises the external monitor.

9. The computer-implemented method of claim 8, further comprising:

controlling, by the one or more computing devices, the second autonomous vehicle to travel to the location of the first autonomous vehicle in response to a request by the first autonomous vehicle for an external monitor to generate the vehicle diagnostics information.

10. The computer-implemented method of claim 1, wherein determining, by the one or more computing devices, the first remote inspection information comprises:

determining, by the one or more computing devices, the one or more categories pertaining to the first third-party entity;

determining, by the one or more computing devices, the assessment based at least in part on the vehicle diagnostics information; and generating, by the one or more computing devices, the first remote inspection information based at least in part on the assessment.

11. The computer-implemented method of claim 1, wherein providing, by the one or more computing devices, the first remote inspection information to the first third-party entity comprises:

providing, by the one or more computing devices, the first remote inspection information to a remote computing system associated with the first third-party entity at one or more times while the first autonomous vehicle is providing a vehicle service.

12. A computing system comprising:

one or more processors; and one or more tangible, non-transitory, computer readable media that store instructions that when executed by the one or more processors cause the computing system to perform operations, the operations comprising:

determining vehicle diagnostics information associated with a first autonomous vehicle;

determining a first region located along a transportation route along which the first autonomous vehicle is or will be travelling;

determining first remote inspection information associated with the first autonomous vehicle based at least in part on the vehicle diagnostics information and a first third-party entity associated with the first region, wherein the first third-party entity is associated with at least one of: (i) a government entity, (ii) a regulatory entity, or (iii) an administrative entity of the first region, and wherein the first remote inspection information comprises an assessment of one or more categories pertaining to the first third-party entity associated with the first region;

providing the first remote inspection information to the first third-party entity;

determining a second region located along a transportation route along which the first autonomous vehicle is or will be travelling, the second region being different than the first region;

determining second remote inspection information associated with the first autonomous vehicle based at least in part on the vehicle diagnostics information and a second third-party entity associated with the second region, wherein the second remote inspection information comprises an assessment of one or more categories pertaining to the second third-party entity; and providing the second remote inspection information to the second third-party entity.

13. The computing system of claim 12, wherein determining the vehicle diagnostics information comprises:

controlling the first autonomous vehicle to travel to a location of an external monitor that generates the vehicle diagnostics information.

14. The computing system of claim 12, wherein determining the vehicle diagnostics information comprises:

controlling an external monitor to travel to a location of the first autonomous vehicle; and controlling the external monitor to generate the vehicle diagnostics information.

15. The computing system of claim 12, wherein determining the first remote inspection information comprises:

determining the one or more categories pertaining to the first third-party entity;

determining the assessment based at least in part on the vehicle diagnostics information; and generating the first remote inspection information based at least in part on the assessment.

16. The computing system of claim 12, wherein providing the first remote inspection information to the first third-party entity comprises:

providing the first remote inspection information to a remote computing system at one or more times while the first autonomous vehicle is providing a vehicle service.

17. An autonomous vehicle, comprising:

one or more processors; and one or more tangible, non-transitory, computer readable media that store instructions that when executed by the one or more processors cause the autonomous vehicle to perform operations, the operations comprising:

determining vehicle diagnostics information associated with the autonomous vehicle;

determining a first region located along a transportation route along which the first autonomous vehicle is or will be travelling;

determining first remote inspection information associated with the first autonomous vehicle based at least in part on the vehicle diagnostics information and a first third-party entity associated with the first region, wherein the first third-party entity is associated with at least one of: (i) a government entity, (ii) a regulatory entity, or (iii) an administrative entity of the first region, and wherein the first remote inspection information comprises an assessment of one or more categories pertaining to the first third-party entity;

providing the first remote inspection information to the first third-party entity;

determining a second region located along a transportation route along which the first autonomous vehicle is or will be travelling, the second region being different than the first region;

determining second remote inspection information associated with the first autonomous vehicle based at least in part on the vehicle diagnostics information and a second third-party entity associated with the second region, wherein the second remote inspection information comprises an assessment of one or more categories pertaining to the second third-party entity; and providing the second remote inspection information to the second third-party entity.

18. The autonomous vehicle of claim 17, wherein determining the vehicle diagnostics information comprises:

controlling the autonomous vehicle to travel to a location of an external monitor that generates the vehicle diagnostics information.

19. The autonomous vehicle of claim 17, wherein determining the first remote inspection information comprises:

determining the one or more categories pertaining to the first third-party entity;

determining the assessment based at least in part on the vehicle diagnostics information; and generating the first remote inspection information based at least in part on the assessment.

20. The autonomous vehicle of claim 17, wherein providing the first remote inspection information to the first third-party entity comprises:

providing the first remote inspection information to a remote computing system associated with the first third-party entity at one or more times while the autonomous vehicle is providing a vehicle service.

* * * * *